US010455764B2

(12) United States Patent
Noll et al.

(10) Patent No.: US 10,455,764 B2
(45) Date of Patent: Oct. 29, 2019

(54) HARVESTER COMBINE HEADER LIFTING POWER UNIT

(71) Applicant: CNH Industrial America LLC, New Holland, PA (US)

(72) Inventors: Blaine Robert Noll, Fleetwood, PA (US); Craig Donald Roberts, Denver, PA (US); Andrew Victor Lauwers, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 167 days.

(21) Appl. No.: 15/658,773

(22) Filed: Jul. 25, 2017

(65) Prior Publication Data

US 2019/0029173 A1 Jan. 31, 2019

(51) Int. Cl.
*A01D 41/14* (2006.01)
*A01D 41/127* (2006.01)
*A01D 61/00* (2006.01)

(52) U.S. Cl.
CPC ......... *A01D 41/141* (2013.01); *A01D 41/127* (2013.01); *A01D 41/14* (2013.01); *A01D 41/145* (2013.01); *A01D 61/004* (2013.01)

(58) Field of Classification Search
CPC .... A01D 34/04; A01D 34/006; A01D 45/006; A01D 41/141; A01D 41/145; A01D 41/127; A01D 57/00; A01D 57/02; A01D 41/14; A01D 61/004
USPC .................................. 56/10.2 E, 10.2 R, 208
See application file for complete search history.

(56) References Cited

U.S. PATENT DOCUMENTS

| 2,750,727 | A | | 1/1953 | Wright |
|---|---|---|---|---|
| 3,472,009 | A | | 10/1969 | Porter |
| 3,595,000 | A | | 7/1971 | Recker |
| 3,605,391 | A | | 9/1971 | Schott et al. |
| 3,908,345 | A | * | 9/1975 | Oni ...................... A01D 41/141 56/208 |
| 4,414,792 | A | * | 11/1983 | Bettencourt ......... A01D 41/141 56/10.2 E |
| 6,116,006 | A | | 9/2000 | Killen et al. |
| 7,022,012 | B2 | | 3/2006 | Heinsey et al. |
| 7,661,251 | B1 | | 2/2010 | Sloan et al. |
| 7,971,420 | B1 | | 7/2011 | Bollin |
| 8,720,170 | B2 | * | 5/2014 | Deneault .............. A01D 41/141 56/10.2 E |
| 8,863,483 | B2 | * | 10/2014 | Patterson ............... A01D 43/04 56/10.2 E |

FOREIGN PATENT DOCUMENTS

| DE | 313389 A1 | 3/1983 |
|---|---|---|
| DE | 19536345 A1 | 4/1997 |
| DE | 102004024232 A1 | 12/2005 |

* cited by examiner

*Primary Examiner* — Robert E Pezzuto
(74) *Attorney, Agent, or Firm* — Peter K. Zacharias; Patrick M. Sheldrake

(57) ABSTRACT

A header for an agricultural harvester includes a header body that is configured to be connected to the harvester. The header body is configured for cutting plants from the ground and distributing those plants to a feeder of the agricultural harvester. A wheel is attached to the header body for contacting the ground to support the header body above the ground. A lifting power unit moves the wheel with respect to the header body to adjust a distance between the header body and the ground.

20 Claims, 6 Drawing Sheets

HARVESTER COMBINE HEADER LIFTING POWER UNIT

FIELD OF THE INVENTION

The present invention relates to a lifting unit for a header of an agricultural machine, such as a harvester combine.

BACKGROUND OF THE INVENTION

As described in U.S. Pat. No. 7,022,012 to CNH America LLC, which is incorporated by reference herein in its entirety, combine harvesters, thrashers and crop cleaners, also known as "combines" or "harvesters", cut crop material close to the ground, gather it together, and thrash it, removing unwanted plant matter and dirt from the grains and seeds (the crop) to be harvested.

The harvester includes a crop delivery system, which includes a header portion and a feeder portion. The header portion of the harvester extends along the ground, engages the stalks of growing plants with a comb-like cutter bar, cuts the plants off very close to the ground, and presents the cut off plant material to the feeder. The feeder portion gathers the cut-off plant material, compresses it slightly, and feeds it to the thrashing portion of the harvester. Feeders typically include a conveyor that extends from the header portion to the thrashing portion of the harvester. This conveyor engages the mat of plant material and draws it upward from ground level where it presents the plant matter to the mouth of the thrashing section.

A wide variety of crops can be harvested by a single harvester. The chassis and thrashing elements of the harvester are typically adjustable to harvest everything from wheat to rice to soybeans to corn. No one single header can be used with all of these crops, however. For that reason, headers are made to be interchangeable. A header for one crop can be unbolted and removed from the feeder and another header for another crop attached in its place. Some of the more common headers include corn headers, auger headers, and draper headers. Corn headers, as one might expect, are intended for harvesting corn. Auger and draper headers are designed to harvest grass crops such as rice, wheat, and oats. These are the most common headers used on harvesters. Different headers for other specialty crops are also known and used, but in lesser numbers.

The feeder raises and lowers, and generally supports, the header portion with respect to the ground. As headers get larger it is harder for the combine feeder to lift and support the entire weight of the header. What is sought in the industry is an improved system for supporting the weight of the headers, as compared to conventional designs.

SUMMARY OF THE INVENTION

In one embodiment, a header for an agricultural harvester comprises a header body that is configured to be connected to the harvester. The header body is configured for cutting plants from the ground and distributing those plants to a feeder of the agricultural harvester. A wheel is attached to the header body for contacting the ground to support the header body above the ground. A lifting power unit moves the wheel with respect to the header body to adjust a distance between the header body and the ground.

In another embodiment, a header for an agricultural harvester comprises a header body that is configured to be connected to the harvester. The header body is configured for cutting plants from the ground and distributing those plants to a feeder of the agricultural harvester. A wheel is attached to the header body for contacting the ground to support the header body above the ground. A lifting power unit includes: (a) a sensor for sensing, either directly or indirectly, the distance between the ground and the header body; (b) means for moving the wheel with respect to the header body; and (c) a controller that is configured to activate the moving means based upon the distance sensed by the sensor, wherein, once activated, the moving means moves the wheel to change the distance between the header body and the ground.

In yet another embodiment, a header for an agricultural harvester comprises a header body that is configured to be connected to the harvester. The header body is configured for cutting plants from the ground and distributing those plants to a feeder of the agricultural harvester. A wheel is attached to the header body for contacting the ground to support the header body above the ground. A lifting power unit includes: (a) a sensor for sensing, either directly or indirectly, the distance between the ground and the header body; (b) a hydraulic or pneumatic cylinder for moving the wheel with respect to the header body; (c) a pump for actuating the cylinder; and (d) a controller that is configured to activate the pump based upon the distance sensed by the sensor, wherein, once activated, the pump actuates the cylinder to move the wheel with respect to the header body, thereby changing the distance between the header body and the ground. The cylinder may have a piston. Alternatively, the cylinder may be a displacement-type cylinder which does not include a piston and can only be actuated in one direction (i.e., to raise the header). The header would fall under its own weight upon relieving the hydraulic pressure within the displacement-type cylinder.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

In general, aspects of the present invention relate to a work vehicle, particularly agricultural work vehicles such as a harvester combine. It should be appreciated, however, that the invention is not limited to a combine, or any other particular type of work vehicle. Aspects of the invention are described herein with reference to a combine for illustrative purposes only.

Figure 1:
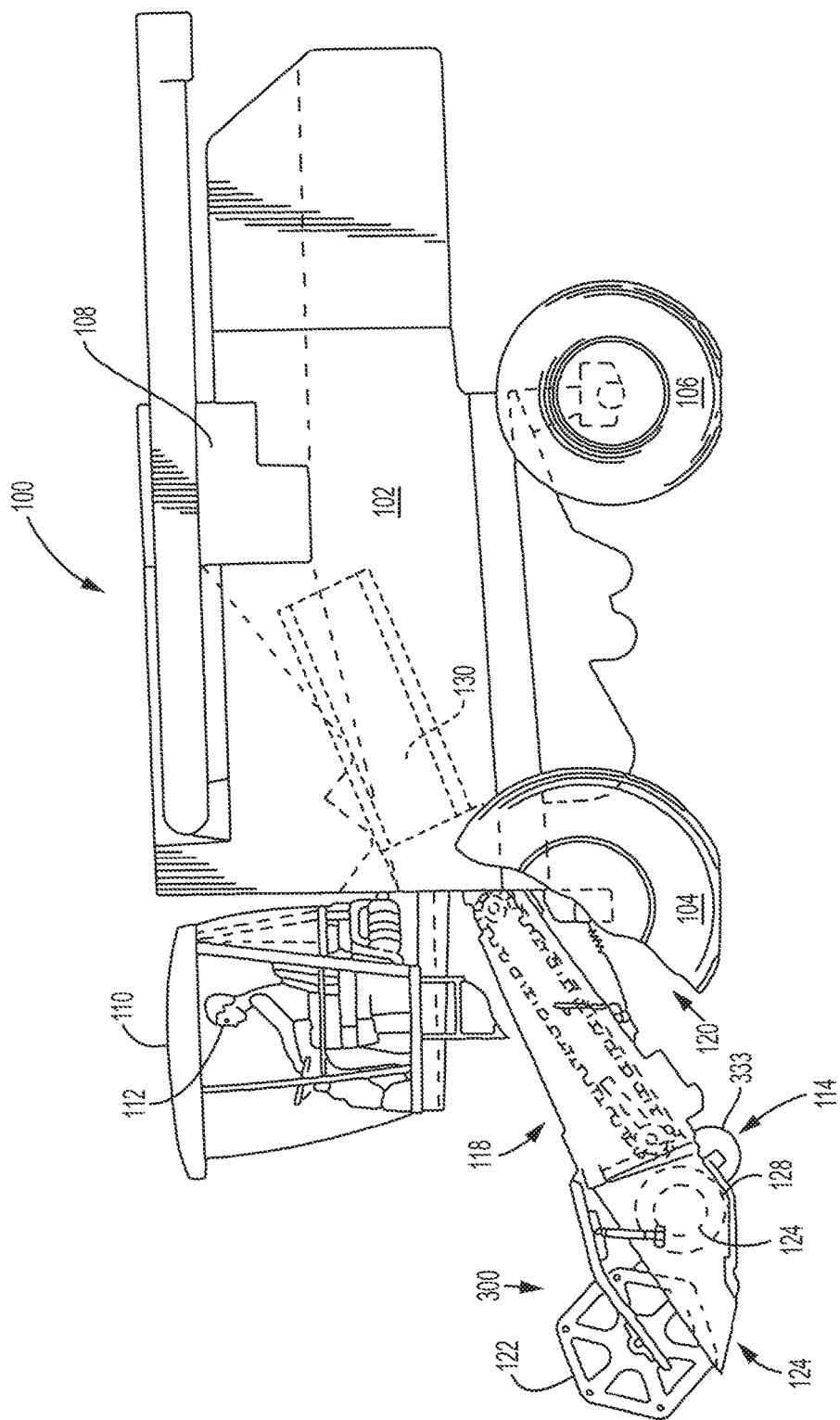
FIG. 1 depicts an agricultural work vehicle as a combine harvester.

Referring now to the drawings, wherein like numbers refer to generally like items or features, FIG. 1 depicts a harvester 100. Harvester 100 generally includes a self-propelled vehicle 102 with two pairs of wheels 104, 106, an engine 108 mechanically connected to rotate the wheels, and a cab 110 where the vehicle operator 112 sits. Harvester 100 also includes a crop harvesting system 114 coupled to the front of the self-propelled vehicle 102. The crop harvesting system 114 further includes a header 300 coupled to a feeder 118, that is in turn coupled to the front 120 of the self-propelled vehicle 102.

Header 300 may include a reel assembly 122 for pulling crops into the header 300 so that the crops are cut by a blade assembly 124. Header 300 may also include an auger 126 that is disposed in an auger trough 128. The trough and the auger extend laterally across at least a portion of the width of the header 300. They are positioned to gather all crop matter that is cut by the blade assembly 124 as it falls backward into the header. If the header 300 is an auger head, then the auger 126 would extend across the entire width of the header 300, whereas if the header 300 is a draper head then the auger 126 would be centered on the header 300 with a draper belt on each side of the auger 126 for bringing the crop material to the auger 126.

Auger 126 draws the crop matter into a central portion of the header approximately four to six feet wide. Once the auger has drawn the plant matter towards the center of the header, it pushes the plant matter into feeder 118. The feeder 118 serves to draw material from auger 126 to the inlet of threshing mechanism 130. The feeder also serves to support the header itself and to position the header in front of vehicle 102, slightly above the ground.

As noted above, as headers get larger and heavier it is harder for the feeder to lift and support the entire weight of the header. Exemplary embodiments of the present invention provide an improved system for supporting the weight of the headers, as compared to conventional designs.

Figure 2A:
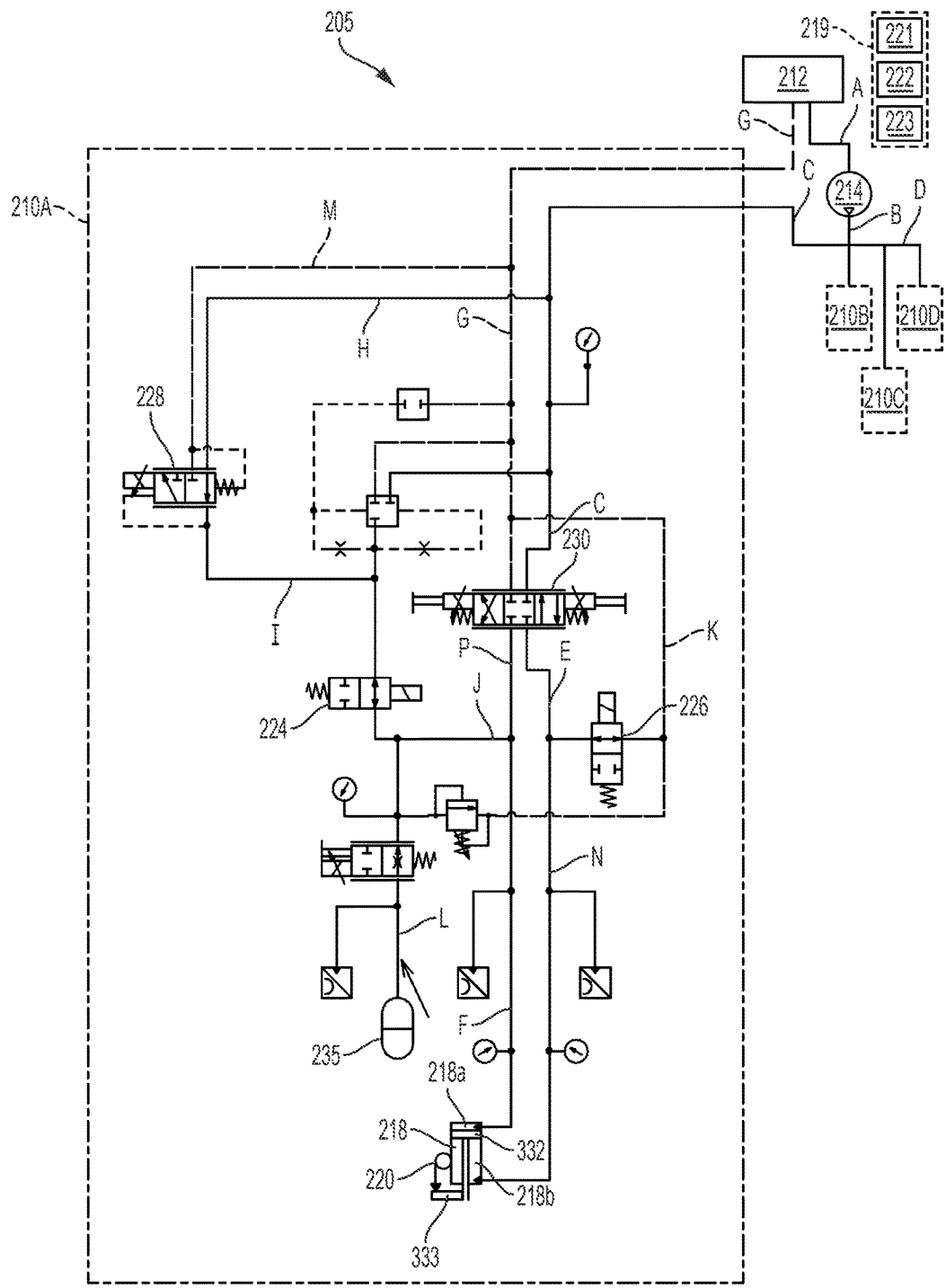
FIG. 2A is a schematic view of an exemplary lifting power unit for a wheel of a header, which is shown operated in an automatic mode to extend the wheel and raise the header away from the ground.
Figure 2B:
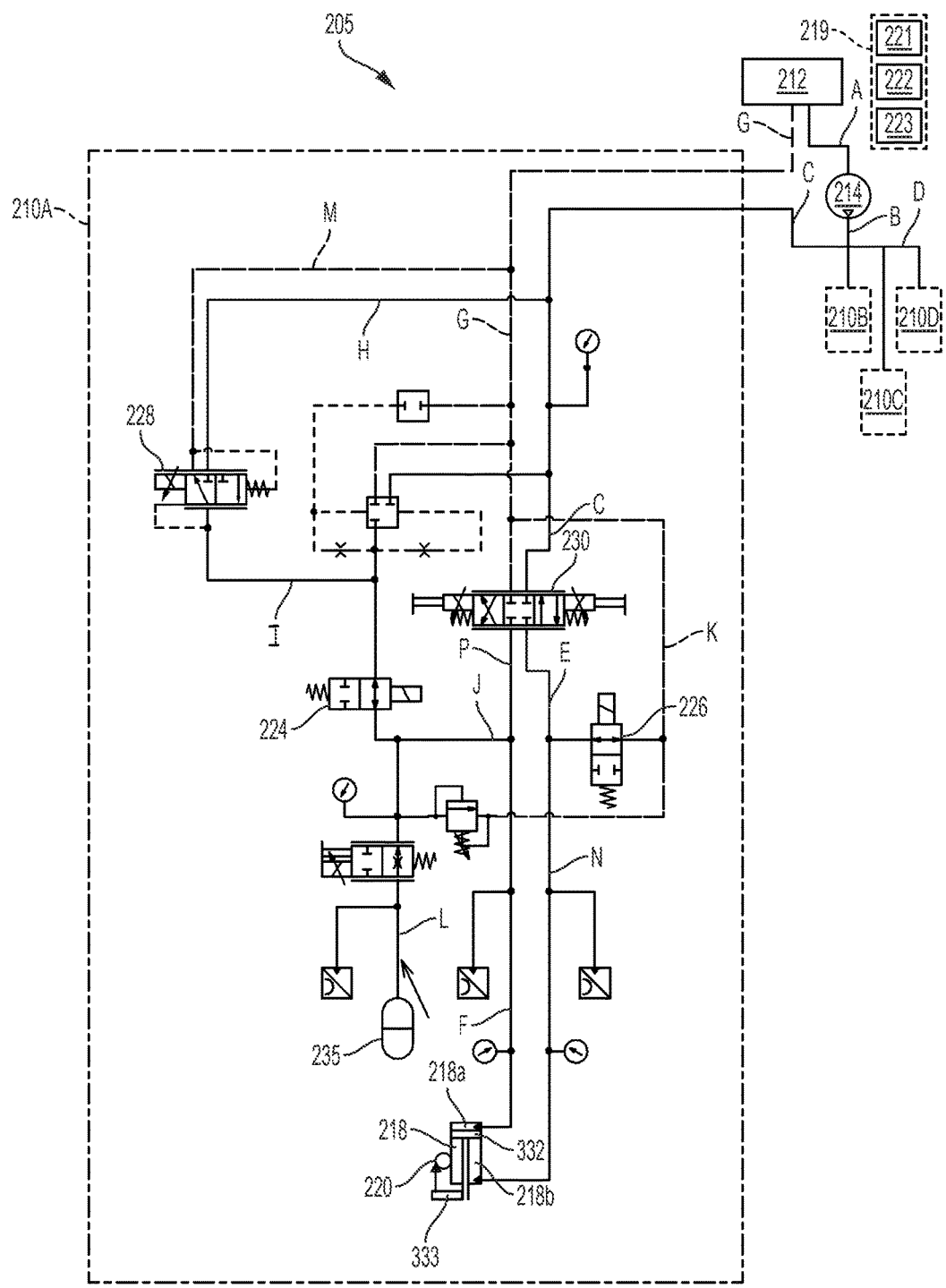
FIG. 2B is a schematic view of the lifting power unit, which is shown operated in the automatic mode to retract the wheel and lower the header toward the ground.
Figure 2C:
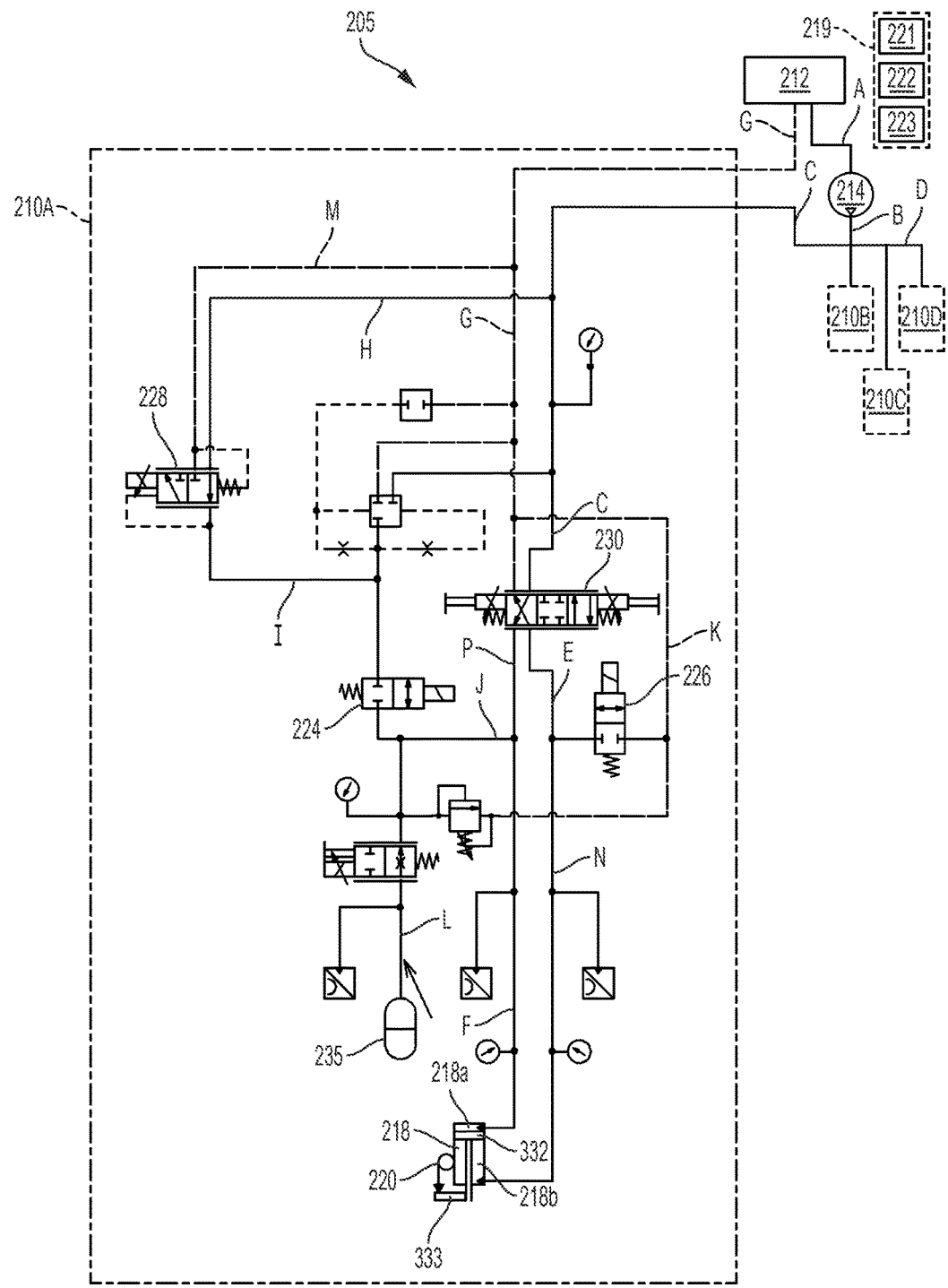
FIG. 2C is a schematic view of the lifting power unit, which is shown operated in a manual mode to extend the wheel and raise the header away from the ground.
Figure 2D:
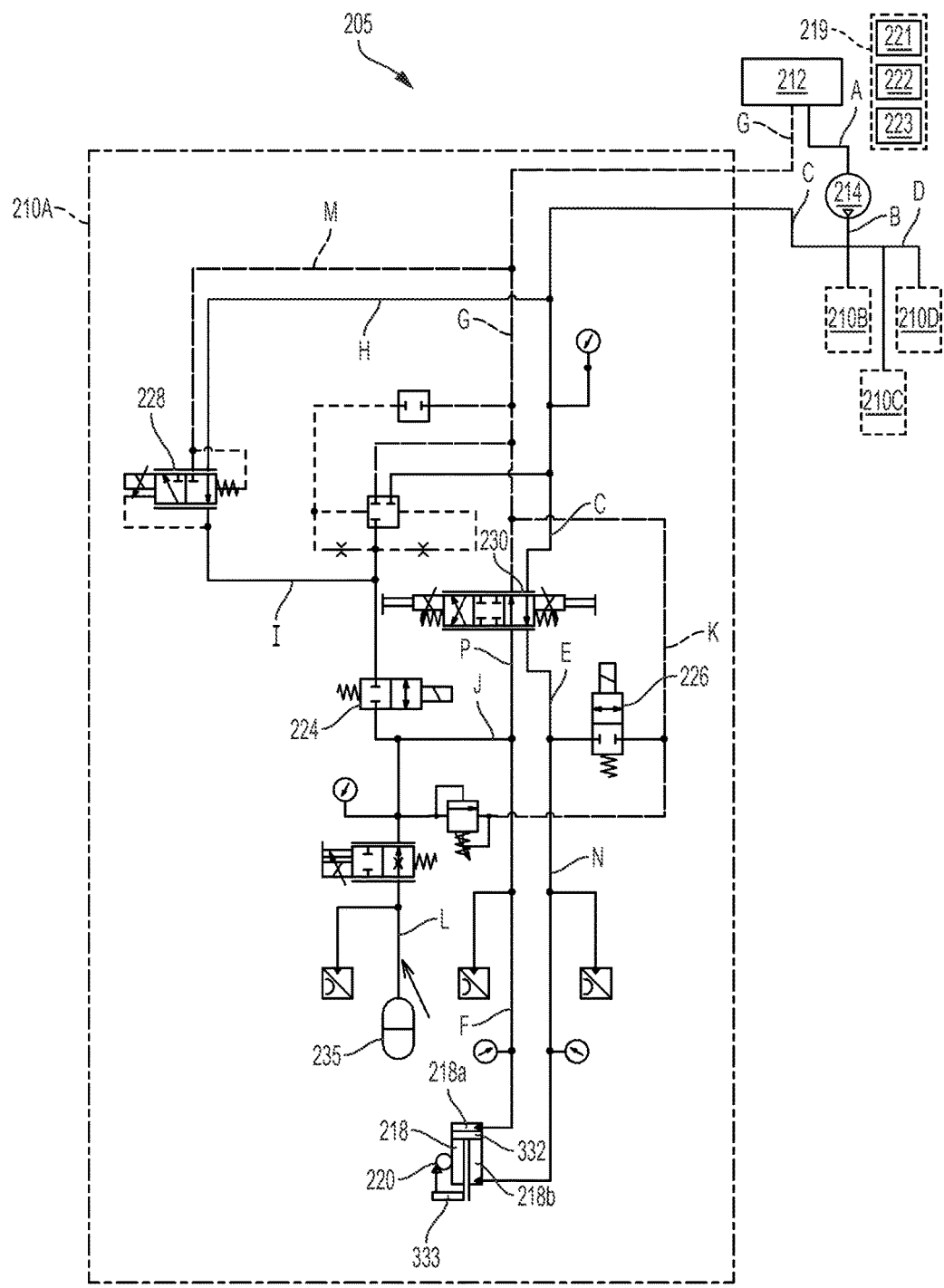
FIG. 2D is a schematic view of the lifting power unit, which is shown operated in the manual mode to retract the wheel and lower the header toward the ground.
Figure 3:
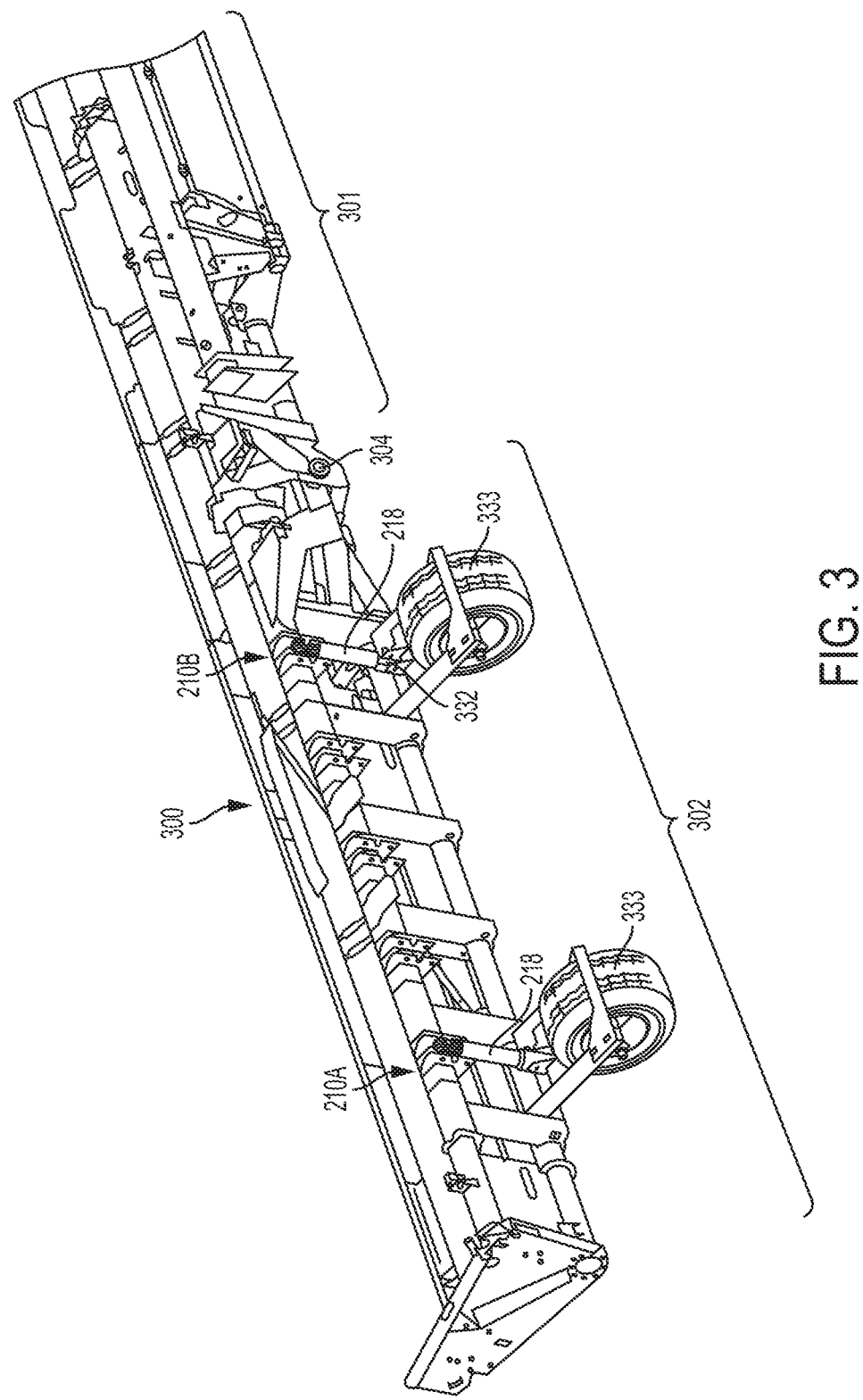
FIG. 3 is a fragmented rear isometric view of the header of FIG. 1 having a center section and two wings (only one wing shown) connected to the center section, wherein the wing section incorporates the lifting power unit.

FIG. 3 illustrates the header 300 used with the harvester 100, in accordance with an exemplary embodiment of the present invention. Various components of the header 300 shown in FIG. 1 are not shown in FIG. 3. FIGS. 2A-2D depict schematics for a system 205 for lifting the header 300 of the harvester 100, in accordance with an exemplary embodiment of the present invention.

The system 205 generally comprises a hydraulic reservoir 212 for containing hydraulic fluid that is fluidly connected to a pump 214. Pump 214 is indirectly connected to a PTO shaft (not shown) of harvester 100 by way of a speed up gearbox. Pump 214 may be operated continuously.

The pump 214 powers a series of lifting power units 210A-210D (referred to individually or collectively as lifting power unit(s) 210). Each lifting power unit 210 is responsible for lifting one or more wheels 333 that is/are connected to the header 300 of harvester 100. In other words, a plurality of wheels 333 are connected to the header 300, and the wheels 333 are moveable (by way of lifting power units 210) for lifting the header 300 either toward or away from the ground. The wheels 333 help support the weight of the header 300. The wheels 333 are mounted directly beneath and/or behind the header 300, as shown in FIGS. 1 and 3. It should be understood that the wheels 333 do not propel the harvester 100. Alternatively, according to another embodiment, the wheels 333 could be configured to either propel or assist in propelling the harvester 100.

The lifting power units 210 are individually controllable to lift different sections or parts of the header 300 to desired heights, which may be the same or different from each other. In the figures, the boundary of the lifting power units 210 are designated by dot-dash lines. All of the lifting power units 210 are substantially similar, and only the lifting power unit 210A will be described hereinafter in the interest of brevity. Forward path fluid lines are depicted by solid lines, and return path fluid lines are depicted by broken lines. Fluid lines that function as both forward and return path lines are depicted by solid lines. Also, the components of the system 205 that are located either in or on the vehicle 102 are bounded by box 219, whereas the remaining components of the system 205 may be located on the header 300 that is attached to the vehicle 102.

Hydraulic reservoir 212, pump 214, and lifting power units 210 of the system 205 are mounted to header 300 to form a self-contained header unit, however, one or more of those components may also be mounted to feeder 118. By combining all of those components into header 300, header 300 may be used interchangeably on any harvester.

The lifting power units 210A-210D are capable of being operated in either a manual mode or an automatic mode. A user-operated switch 221 may be located in the cab of the vehicle 102 for toggling between the manual and automatic modes. The automatic mode will be described first with reference to FIGS. 2A and 2B.

In the automatic mode, the vertical position of the header 300 with respect to the ground underneath is monitored, either directly or indirectly, by a sensor 220. The sensor 220 may be, for example, a pressure sensor for sensing the pressure within the wheel cylinder 218, or an optical sensor for sensing either the vertical distance between the header 300 and the ground beneath or the vertical distance between the header 300 and the wheel 333. The sensor 220 may be any type of sensor that is known to those skilled in the art which can sense, either directly or indirectly, the vertical position of the header 300 with respect to the ground underneath.

The sensor 220 communicates the sensed position of the header 300 in the form of an electrical signal, via a wired or wireless connection, to a controller 222 having a computer processor and a memory, which is shown schematically. The computer processor of the controller 222 determines whether the header 300 needs to be either raised or lowered based upon the difference between the sensed position and a pre-determined threshold value stored in memory. The controller 222 is configured to communicate with the electrically operated components of the lifting power unit 210A, such as all of the valves, the pump 214, and the sensor 220.

Referring now to FIG. 2A, the following explanation assumes that the lifting power unit 210A is operated in an automatic mode to raise the header 300 in a vertical direction away from the ground beneath, as determined by the processor of the controller 222.

As a first step, the controller 222, either directly or indirectly, instructs the normally-closed open/close valves 224 and 226 to open. The valves 224 and 226 are shown in the open position in FIG. 2A. The two-position valve 228 is maintained in its normal position shown in FIG. 2A for raising the header 300. The 4-3 way valve 230 is maintained in its normally closed position shown in FIG. 2A.

Fluid is delivered from hydraulic reservoir 212 to pump 214 via conduit A. Pump 214, which is operated in a continuous fashion, delivers the fluid under pressure through conduits B, C and D to every lifting power unit 210. As noted above, only operation of lifting power unit 210A will be described hereinafter, and it should be assumed that the other lifting power units 210 operate in the same fashion.

Fluid is delivered under pressure into the lifting power unit 210A via conduit C. Fluid travels through conduit C to the closed 4/3 way solenoid valve 230. Fluid cannot pass through the closed valve 230. The fluid also travels from conduit C, through the conduit H, through the valve 228, into conduit I, through the open valve 224, into conduit J, into conduit F, and into the chamber 218a of the wheel cylinder 218. Fluid pressure builds within the chamber 218a causing the piston 332 to move downward, which causes fluid to leave chamber 218b of the wheel cylinder 218. Fluid within chamber 218b travels into conduit N, through the open valve 226 (fluid cannot travel through the closed valve 230), into return conduit K, into return conduit G and back into hydraulic reservoir 212.

As the piston 332 moves downwardly, the wheel 333 is caused to move downwardly, and, as the wheel 333 moves downwardly, the header 300 rises in a vertical direction and moves away from the ground. This operation is continued until the sensor 220 senses that the header 300 has reached a pre-determined desired height from the ground. Thereafter, the valves 224 and 226 are permitted to close in order to maintain the header 300 at its pre-determined desired height. A pressure accumulator 235 is connected to conduit L, which is connected to conduits J and F, to stabilize the pressure within the chamber 218a during operation.

Referring now to FIG. 2B, the following explanation assumes that the lifting power unit 210A is operated in an automatic mode to lower header 300 toward the ground beneath, as determined by the processor of the controller 222.

As a first step, the controller 222, either directly or indirectly, instructs the normally-closed open/close valves 224 and 226 to open. The controller 222 also instructs the two-position valve 228 to move to the position that is shown in FIG. 2B in order to lower the header 300. Valve 230 remains closed, as shown.

Fluid is delivered under pressure by the pump 214 into the lifting power unit 210A via conduit C, however, the fluid does not reach the wheel cylinder 218. More particularly, fluid travels through conduits C and H until it reaches the valve 228 and the 4/3 way solenoid valve 230. In the automatic mode, the valve 230 is in the closed position (as shown) so that fluid cannot pass through the valve 230. Also, in the position of the valve 228 shown in FIG. 2B, fluid cannot travel from conduit H to conduit I. Accordingly, the pump 214 is disconnected from the wheel cylinder 218, and the pump 214 continues to cycle.

By opening valves 224 and 226, and moving the valve 228 to the position shown in FIG. 2B, fluid within the chambers 218a and 218b can return to the reservoir 212, thereby causing the piston 332, along with the wheel 333, to move upwardly under the weight of the header 300. More particularly, fluid within chamber 218a of the wheel cylinder 218 travels into the conduit F, then into conduit J, through the open valve 224, into conduit I through the valve 228, into return conduit M, into return conduit G, and is returned back into reservoir 212. Some of the fluid within return conduit G also travels into return conduit K, through open valve 226, through conduit N and into chamber 218b of the wheel cylinder 218.

Depressurization of the chambers 218a and 218b of the wheel cylinder 218 permits the piston 332, along with the wheel 333, to retract and move upwardly under the weight of the header 300. Accordingly, the header 300 moves closer toward the ground. This operation is continued until the sensor 220 senses that the header 300 has reached a pre-determined desired height from the ground. Thereafter, the valves 224 and 226 are permitted to close in order to maintain the header 300 at its pre-determined desired height.

As noted above, the lifting power units 210A-210D are capable of being operated in either a manual mode or an automatic mode. The manual mode will now be described with reference to FIGS. 2C and 2D. A user can switch between the manual and automatic modes using the switch 221, which may be located in the cab of the harvester. Once in the manual mode, the vertical position of the header 300 with respect to the ground underneath it can be manually adjusted by way of a user interface 223 (such as a joystick, lever, button or user-operated display) in the cab of the harvester. The switch 221 and the user interface 223 communicate with the controller 222. In the manual mode, the valves 224 and 226 remain in their normally-closed positions, and the valve 228 remains in its normal position shown in FIGS. 2C and 2D.

Referring now to FIG. 2C, the following explanation assumes that the lifting power unit 210A is operated in the manual mode to raise the header 300 away from the ground.

As a first step, the user switches to the manual mode using the switch 221, and then the user instructs the wheel cylinder 218 to raise the header 300 using the user interface 223. Consequently, the controller 222, either directly or indirectly, instructs the 4-3 way valve 230 to move to the position that is shown in FIG. 2C in order to raise the header 300.

Fluid is delivered from hydraulic reservoir 212 to pump 214 via conduit A. Pump 214, which is operated in a continuous fashion, delivers the fluid under pressure through conduits B, C and D to every lifting power unit 210. As noted above, only operation of lifting power unit 210A will be described hereinafter, and it should be assumed that the other lifting power units 210 operate in the same fashion.

Fluid is delivered under pressure into the lifting power unit 210A via conduit C. Fluid travels through conduit C, through the 4/3 way solenoid valve 230, into conduit P, into conduit F, and into the chamber 218a of the wheel cylinder 218. Fluid pressure builds within the chamber 218a causing the piston 332 to move downward, which causes fluid to leave chamber 218b of the wheel cylinder 218. Fluid within chamber 218b travels into conduit N, through the valve 230, into return conduit G and back into hydraulic reservoir 212. It is noted that fluid delivered by the pump 214 also travels from conduit C, into conduit H, through valve 228, and into conduit I; however, the fluid cannot reach conduit J and the wheel cylinder 218 because the valve 224 is closed.

As the piston 332 moves downwardly, the wheel 333 is caused to move downwardly, and, as the wheel 333 moves downwardly, the header 300 rises in a vertical direction and moves away from the ground. This operation is continued until either the header 300 reaches a set height (as set by the user using the user interface 223), the user releases/deactivates the user interface 223, or the header 300 cannot be translated any further. If the height of the header 300 is set by the user using the user interface 223, then the sensor 220 would sense the height of the header 300 and communicate the same to the controller 222.

Once the header 300 reaches its desired height, the valve 230 is permitted to close (the closed valve 230 is shown in FIG. 2A) in order to maintain the header 300 at its predetermined desired height. The pressure accumulator 235 ensures that pressure within the chamber 218*a* remains uniform.

Referring now to FIG. 2D, the following explanation assumes that the lifting power unit 210A is operated in the manual mode to lower the header 300 toward the ground.

As a first step, the user switches to the manual mode using the switch 221 (if not already in manual mode), and then the user instructs the wheel cylinder 218 to lower the header 300 using the user interface 223. Consequently, the controller 222, either directly or indirectly, instructs the 4-3 way valve 230 to move to the position that is shown in FIG. 2D in order to lower the header 300.

Fluid is delivered under pressure by the pump 214 into the lifting power unit 210A via conduit C. Fluid travels into conduit C, through the 4/3 way solenoid valve 230 (as configured in FIG. 2D), into conduit E, into conduit N and into chamber 218*b* of the wheel cylinder 218. Fluid pressure builds within the chamber 218*b* causing the piston 332 to move upward, which causes fluid to leave chamber 218*a* of the wheel cylinder 218. Fluid within chamber 218*a* travels into conduit F, into conduit P, through the valve 230, into return conduit G and is returned back into hydraulic reservoir 212.

As the piston 332 moves upwardly, the wheel 333 is caused to move upwardly, and, as the wheel 333 moves upwardly, the header 300 lowers in a vertical direction and moves toward the ground. This operation is continued until either the header 300 reaches a set height (as set by the user using the user interface 223), the user releases the user interface 223, or the header 300 cannot be translated any further. If the height of the header 300 is set by the user using the user interface 223, then the sensor 220 would sense the height of the header 300 and communicate the same to the controller 222.

Once the header 300 reaches its desired height, the valve 230 is permitted to close (the closed valve 230 is shown in FIG. 2A) in order to maintain the header 300 at its predetermined desired height. The pressure accumulator 235 ensures that pressure within the chamber 218*a* remains uniform.

Although the system 205 has been described as a hydraulic system, the system 205 may be pneumatic, i.e., powered by air, in lieu of hydraulic fluid. More generally, it should be understood that the wheels 333 may be moved using any type of mechanical and/or electrical system. For those reasons, the lifting power units 210A-210D may generally include a "means for moving" the wheels 333 to adjust the height of the header 300. The means for moving may include a hydraulic actuator (as described throughout), a pneumatic actuator, an electric motor, a power take off shaft of the harvester, an engine, a solenoid, or any other motive means that is known to those of ordinary skill in the art.

FIG. 3 depicts a fragmented rear isometric view of the header 300. The header 300 includes wing sections 302 (only one shown) that are independently pivotably connected to ends of a center section 301 about a pivot 304. The other wing section 302 that is not shown in positioned on the opposite side of the center section 301. The center section 301 is attached to the feeder (such as feeder 118) of a harvester. The lifting power units 210A and 210B are responsible for lifting the two wheels 333 on the wing section 302, whereas the lifting power units 210C and 210D (not shown in FIG. 3) are responsible for lifting the other wing section that is not shown in FIG. 3.

According to this embodiment, the wheels 333 are positioned on opposite ends of the wing section 302. Alternatively, the wheels 333 may also be positioned on the center section 301. The wheels 333 could also be uniformly positioned along the entire length of the header 300. It should be understood that the header may include one or more wing sections, or the header may not include any wing sections at all.

The wheels 333 are positioned behind (i.e., rearward of) the header 300, such that the wheels 333 are positioned between the header 300 and the front wheels 104 (see FIG. 1) of the harvester. The wheels 333 are also positioned at an elevation below the header 300 so as to support the weight of the header 300.

In a conventional harvester, one or more feeder lift cylinders are responsible for lifting the feeder. The conventional harvester does not include any lift cylinders tasked with independently lifting the header. According to exemplary embodiments of the instant invention, because the header 300 is attached to the feeder 118, the aforementioned feeder lift cylinders also lift the header 300. The system 205 described above could potentially be used in conjunction with the feeder lift cylinders, or the system 205 may replace the feeder lift cylinder of the harvester.

It is to be understood that the steps of the methods described herein are performed by the controller 222 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 222 described herein, such as the methods of raising and lowering the header 300, in either manual or automatic mode, is implemented in software code or instructions which are tangibly stored on a tangible computer readable medium. Upon loading and executing such software code or instructions by the controller 222, the controller 222 may perform any of the functionality of the controller 222 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. For example, as noted above, the hydraulic cylinder 218 may be replaced by a displacement-type cylinder which does not include a piston and can only be hydraulically actuated in one direction (i.e., to raise the header). It is to be understood that this invention is not limited to the particular embodiments described herein, but is intended to include all changes and modifications that are within the scope and spirit of the invention.

What is claimed is:

1. A header for an agricultural harvester, the header comprising:
   an articulating header body that is configured to be connected to the harvester, the articulating header body comprising multiple sections that are configured to articulate with respect to each other, the articulating header body configured for cutting plants from the ground and distributing those plants to a feeder of the agricultural harvester;
   at least two wheels attached to the articulating header body for contacting the ground to support the articulating header body above the ground, each wheel being attached to a different section of the multiple sections of the articulating header body; and
   a first lifting power unit for moving one wheel of the at least two wheels with respect to a first section of the articulating header body to adjust a distance between said first section of the articulating header body and the ground; and
   a second lifting power unit for moving another wheel of the at least two wheels with respect to a second section of the articulating header body to adjust a distance between said second section of the articulating header body and the ground,
   wherein the first and second lifting power units are configured to move the respective sections of the articulating header body to different heights.

2. The header of claim 1, wherein each lifting power unit includes a sensor for sensing, either directly or indirectly, the distance between the ground and the header body.

3. The header of claim 2, wherein each lifting power unit includes a hydraulic or pneumatic cylinder including a piston, the cylinder being attached, either directly or indirectly, to both the wheel of the respective lifting power unit and the header body for moving the wheel with respect to the header body.

4. The header of claim 3, wherein the sensor senses a pressure with the cylinder, which is indicative of the distance between the header body and the ground.

5. The header of claim 2, wherein each lifting power unit is configured to be operated in either a manual mode or an automatic mode.

6. The header of claim 5, wherein, in the automatic mode, each lifting power unit is configured to move the wheel of the respective lifting power unit as a function of the sensed distance between the ground and the header body.

7. The header of claim 5, further comprising a user interface, and, in the manual mode, the user interface is configured to control each lifting power unit.

8. The header of claim 1, wherein each wheel of the header is not configured to propel the harvester.

9. The header of claim 1, wherein each wheel is directly attached to the header and is separate from wheels of the harvester.

10. The header of claim 1, wherein each lifting power unit comprises:
    (a) a sensor for sensing, either directly or indirectly, the distance between the ground and the header body;
    (b) means for moving the wheel of the respective lifting power unit with respect to the header body; and
    (c) a controller that is configured to activate the moving means based upon the distance sensed by the sensor, wherein, once activated, the moving means changes the distance between the header body and the ground.

11. The header of claim 10, wherein the means comprises a hydraulic or pneumatic cylinder including a piston, the cylinder being attached, either directly or indirectly, to both the wheel of the respective lifting power unit and the header body for moving the wheel with respect to the header body.

12. The header of claim 11, wherein the sensor senses a pressure within the cylinder, which is indicative of the distance between the header body and the ground.

13. The header of claim 10, wherein each lifting power unit is configured to be operated in either a manual mode or an automatic mode.

14. The header of claim 13, wherein, in the automatic mode, each lifting power unit is configured to move the wheel of the respective lifting power unit as a function of the sensed distance between the ground and the header body.

15. The header of claim 10, wherein each wheel is directly attached to the header and is separate from wheels of the harvester.

16. The header of claim 1, wherein each lifting power unit comprises:
    (a) a sensor for sensing, either directly or indirectly, the distance between the ground and the header body;
    (b) a hydraulic or pneumatic cylinder for moving the wheel of the respective lifting power unit with respect to the header body;
    (c) a pump for actuating the cylinder; and
    (d) a controller that is configured to activate the pump based upon the distance sensed by the sensor, wherein, once activated, the pump actuates the cylinder to move the wheel of the respective lifting power unit with respect to the header body, thereby changing the distance between the header body and the ground.

17. The header of claim 16, wherein the sensor senses a pressure with the cylinder, which is indicative of the distance between the header body and the ground.

18. The header of claim 16, wherein each lifting power unit is configured to be operated in either a manual mode or an automatic mode.

19. The header of claim 18, wherein, in the automatic mode, each lifting power unit is configured to move the wheel of the respective lifting power unit as a function of the sensed distance between the ground and the header body.

20. The header of claim 18, further comprising a user interface, and, in the manual mode, the user interface is configured to control each lifting power unit.

* * * * *